United States Patent [19]
Fisher et al.

[11] Patent Number: 5,994,998
[45] Date of Patent: *Nov. 30, 1999

[54] POWER TRANSFER APPARATUS FOR CONCURRENTLY TRANSMITTING DATA AND POWER OVER DATA WIRES

[75] Inventors: David A. Fisher, Menlo Park; Lawrence M. Burns, Mountain View; Stephen E. Muther, Palo Alto, all of Calif.

[73] Assignee: 3Com Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,016

[22] Filed: May 29, 1997

[51] Int. Cl.$^6$ .............................. H04B 1/00; G08C 19/00
[52] U.S. Cl. ............................... 340/310.01; 340/310.02; 340/310.08; 340/825.72; 375/257; 375/259; 455/3.1; 455/3.3
[58] Field of Search ................ 340/310.01, 310.02, 340/310.08, 825.72; 370/490, 487, 419, 442; 375/257, 259; 307/126, 128, 127; 455/3.1, 3.3

[56] References Cited

U.S. PATENT DOCUMENTS

| | | | |
|---|---|---|---|
| 5,033,112 | 7/1991 | Bowling et al. | 340/310.01 |
| 5,148,144 | 9/1992 | Sutterlin et al. | 340/310.01 |
| 5,368,041 | 11/1994 | Shambroom | 128/731 |
| 5,381,804 | 1/1995 | Shambroom | 128/731 |
| 5,457,629 | 10/1995 | Miller et al. | 340/825.52 |
| 5,477,091 | 12/1995 | Fiorina et al. | 340/310.01 |
| 5,684,826 | 11/1997 | Ratner | 340/310.01 |

OTHER PUBLICATIONS

JVC Information Products Company of America, sales brochure and price list for "VIPSLAN-10 Infrared Wireless LAN System", May 1996.

Clegg, P., "VIPSLAN-10 Streaks Off the Wire", LAN Times, Sep.-1995.

*Primary Examiner*—Donnie L. Crosland
*Attorney, Agent, or Firm*—Kent R. Richardson; Wilson, Sonsini, Goodrich & Rosati

[57] ABSTRACT

Electrical supply current, sufficient to power a wireless access point, is transmitted concurrently with a network data signal across a transmission line. A power and data coupler couples the network data signal and the power signal, received through a data input and a power input respectively, and transmits the coupled signal, to a distance of three meters or more, over the transmission line to a power and data decoupler. The power and data decoupler separates the power signal from the network data signal and supplies those signals to a power output port and a data output port, respectively, for use by a wireless access node. The power signal may be modulated at a low frequency relative to the frequency of the data signal, and the network data signal has a data transmission rate of one megabit/second or higher.

32 Claims, 5 Drawing Sheets

POWER TRANSFER APPARATUS FOR CONCURRENTLY TRANSMITTING DATA AND POWER OVER DATA WIRES

BACKGROUND OF THE INVENTION

1. Field of the Invention

The invention relates in general to the field of data networking and communications, and in particular to interconnecting computers to a local area network ("LAN") or a wide area network ("WAN") through data lines that also carry power.

2. Description of the Related Art

Network devices typically communicate via wired data lines and receive power from a separate line. For example, personal computers ("PCs") may communicate ethernet signals via category three (CAT-3) or category five (CAT-5) twisted pair wire and receive power from a second cable connected to a power source, such as a wall socket or a battery. However, it is desirable to be able to eliminate the need for the second cable. The following describes examples of network devices that benefit from the elimination of the separate power line, and then describes some of the inadequacies of previous solutions.

Plain old telephone service ("POTS") combines a voice signal with a power signal. The combined signal is transmitted over twisted pair cable between the telephone and the line card at the public telephone exchange office. The line card also supplies power over the two wires carrying the voice signal. However, the voice signal supported by POTS is not sufficient for bandwidth intensive communications needs, such as, ethernet communications. Similarly, ISDN communications transmit power and digital data between an ISDN modem and a telephone switch. However, ISDN data rates are more than an order of magnitude lower than ethernet data rates.

Wireless network adapters can interconnect PCs, or other networked devices. The wireless network adaptors use, for example, infrared (IR) or radio frequency (RF) modulation to transmit data between wireless access points and the wireless adaptors connected to PCs. Although the wireless adaptors and wireless access points may be more expensive than comparable wired equipment, they provide savings in wiring costs and permit greater flexibility by allowing the PCs to be moved to any location within the range of the system without the necessity of rewiring the building.

Typically, a transceiver (meaning transmitter and receiver) called a wireless access point, mounted at an elevated location, such as on a ceiling or high on a wall, provides network data communications between a network hub, switch, router or server, to all the PCs located in that room which are equipped with a compatible wireless networking adaptor. The wireless access point is an active electronic device that requires a communications link to a hub or server as well as electrical power to operate. Both the data signal and power signal must be provided to the wireless access point. The data signal is typically at a lower voltage than the power signal, but at a significantly higher frequency, sufficient to sustain a high data transfer rate (e.g., 100 kilobits per second or higher). The available power is usually 110V or 220V AC at frequencies below one hundred Hz. Often two separate sets of wires are used to carry the data signal and power signal. One set of wires is used to couple the wireless access point and the hub and the other set of wires is used to couple the wireless access point to the power outlet.

Eliminating the need for separate power and data wiring simplifies the installation of a wireless access point and can reduce the cost of the installation. Therefore, it is desirable to transmit sufficient electrical power to operate the wireless access point through the network cable that is used to connect the wireless access point to the hub or server.

One possible solution is to transmit power on the unused wires of the data cable. An example of this approach can be found in the VIPSLAN-10™ product manufactured by the JVC Information Products Company of Irvine, Calif. Of course this requires that additional, unused wire pairs be available in the data cable, which may not always be available. Also, if a change in the networking standard in the future dictates the use of the currently unused wire pairs in the networking cable, this solution becomes difficult to implement.

Therefore, what is needed is a solution that reduces the wiring requirements to transmit data and power to a wireless access point without having to use additional wire pairs.

SUMMARY OF THE INVENTION

One embodiment of the invention includes an apparatus for providing electric power supply current to a network device across a transmission line. A power and data coupler ("the coupler") is coupled to one end of the transmission line. The transmission line is also adapted for transmission of a data signal. The coupler has a data input and a power input. Power supply current from the power input is coupled to data signal from the data input and the combined power supply current and data signal is coupled to one end of the transmission line. The opposite end of the transmission line is coupled to a power and data decoupler ("the decoupler"). The decoupler has a power output and a data output. Both the data output and power output of the decoupler are coupled to the network device. The combined power supply current and data signal is decoupled by the decoupler, and the data signal is supplied to the data output and the power supply current is supplied to the power output. Thus, the data signal and the power supply current are coupled and transmitted via the transmission line from the coupler to the decoupler and then decoupled and provided separately to the network device.

In another embodiment, the transmission line includes two transmission lines. One of the transmission lines carries both data and power signals.

In other embodiments, the power signal includes alternating current and/or direct current.

In another embodiment, the transmission lines include twisted pair cables.

In other embodiments, the network devices include wireless access points, network interface cards, peripheral devices and/or network computers.

These features of the invention will be apparent from the following description which should be read in light of the accompanying drawings.

DESCRIPTION OF THE PREFERRED EMBODIMENT

The following describes multiple embodiments of the invention. In one embodiment, power and data are combined and transmitted to a network device such as a wireless access point. The wireless access point uses the power signal to power communication circuits for communicating with wireless network nodes. Because the power and data are combined, the installation of the wireless access point is simplified and may reduce the cost of installing the wireless access points.

Power Transfer Apparatus Overview

Figure 1:
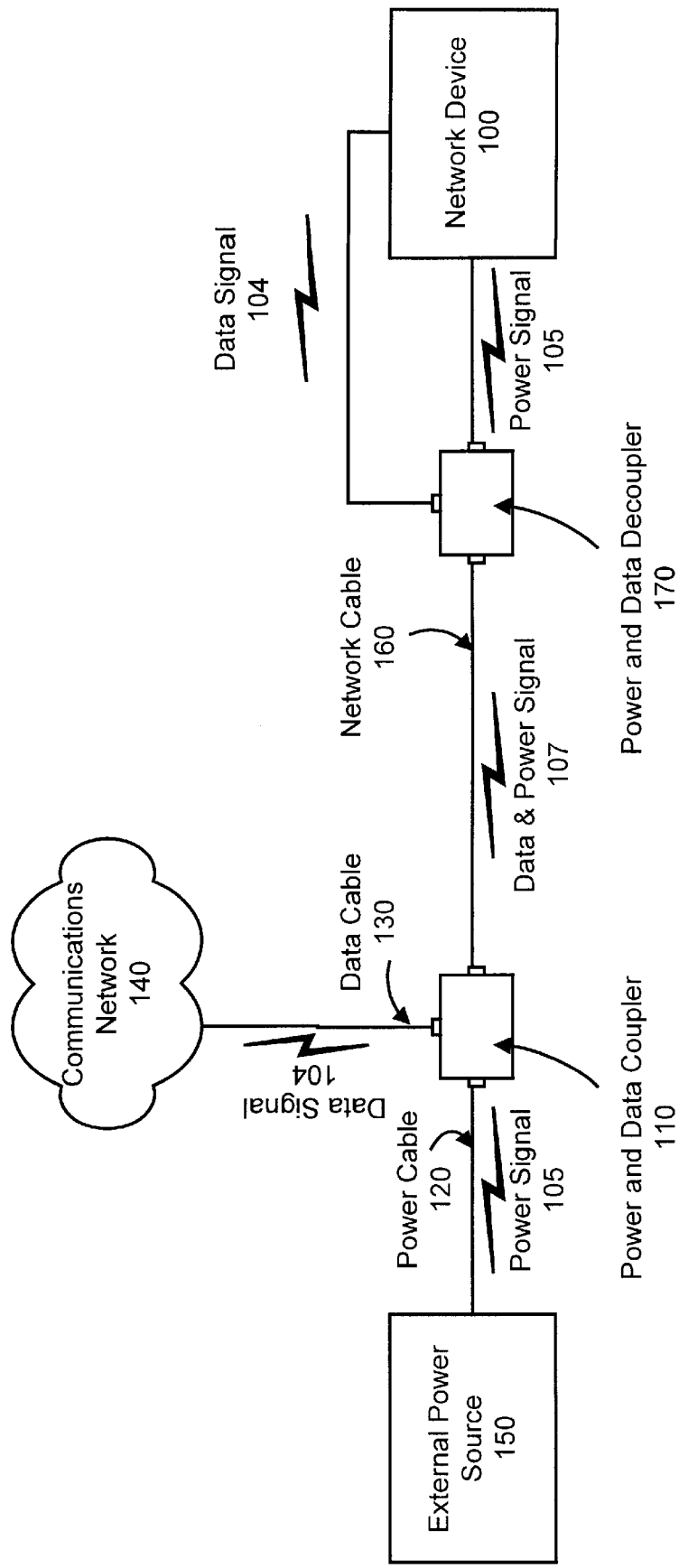
FIG. 1 is an overview of an installation of a power transfer apparatus.

FIG. 1 shows the overall configuration of one embodiment of the invention including a power transfer apparatus. The following lists the elements in FIG. 1 and then describes those elements.

FIG. 1 includes the following elements: an external power source 150; a power cable 120; a data cable 130; a power and data coupler 110; a network cable 160; a power and data decoupler 170; and, a network device 100.

The following describes the coupling of the elements of FIG. 1. The external power source 150 couples to the power and data coupler 110 via the power cable 120. The power cable 120 couples to the power and data coupler 110. The communications network 140 couples to the data cable 130. The data cable 130 couples to the power and data coupler 110. The power and data coupler 110 also couples to the network cable 160. The network cable 160 couples to the power and data decoupler 170. The power and data decoupler 170 couples to the network device 100.

The following describes the elements in greater detail and then describes how the elements act together.

The external power source 150 provides a power signal 105 to the power and data coupler 110. Various embodiments of the invention use different external power sources 150: such as, a computer's power supply, a battery, or a wall outlet and adaptor. What is important, however, is that there is some source of power that can eventually be supplied to the network device 100.

In one embodiment, the power cable 120 is a standard two wire power cable. Other embodiments use other power transfer apparatuses to provide power to the power and data coupler 110.

The communications network 140 is representative of many different types of communications networks supported by various embodiments of the invention. Example communications networks 140 include FDDI, ethernet (including ten Mbits/s, one hundred Mbits/s, and one gigibits/s standards), ATM, token ring, and AppleTalk. However, what is important is that a data signal 104 is communicated between the communication network 140 and the network device 100.

The power and data coupler 110 couples the power signal 105 with the data signal 104 to produce a combined power and data signal 107. The power and data coupler 110 is described in greater detail below. What is important is that there is some combined power and data signal 107 that can eventually be supplied to the network device 100.

The network cable 160 includes one or more wires for transmitting the combined power and data signal 107. In one embodiment, the network cable 160 includes an CAT-3, CAT-5 twisted pair cable, or coaxial cable.

The network device 100 represents a class of devices supported by various embodiments of the invention. For example, in one embodiment, the network device 100 includes a wireless access point. In another embodiment, the network device 100 includes a personal computer having a network interface card. In another embodiment, the network device 100 includes a network computer.

The following describes the general operation of the elements of FIG. 1. A data signal is communicated to the power and data coupler 110 via the data cable 130 from a communications network 140. The combined power and data signal 107 is transmitted over the network cable 160 to the network device 100. In this embodiment, the network cable 160 is longer than three meters and the combined power and data signal 107 communicates data at greater than one megabit/second. (In another embodiment, the network cable length conforms to the IEEE 802.3 specification.) Thus, the power and data coupler 110 supplies both power and data to the network device 100. The network device 100 uses the power to operate which includes receiving, processing, and generating the data signal.

Wireless Access Point having a Power Transfer Apparatus

Figure 2:
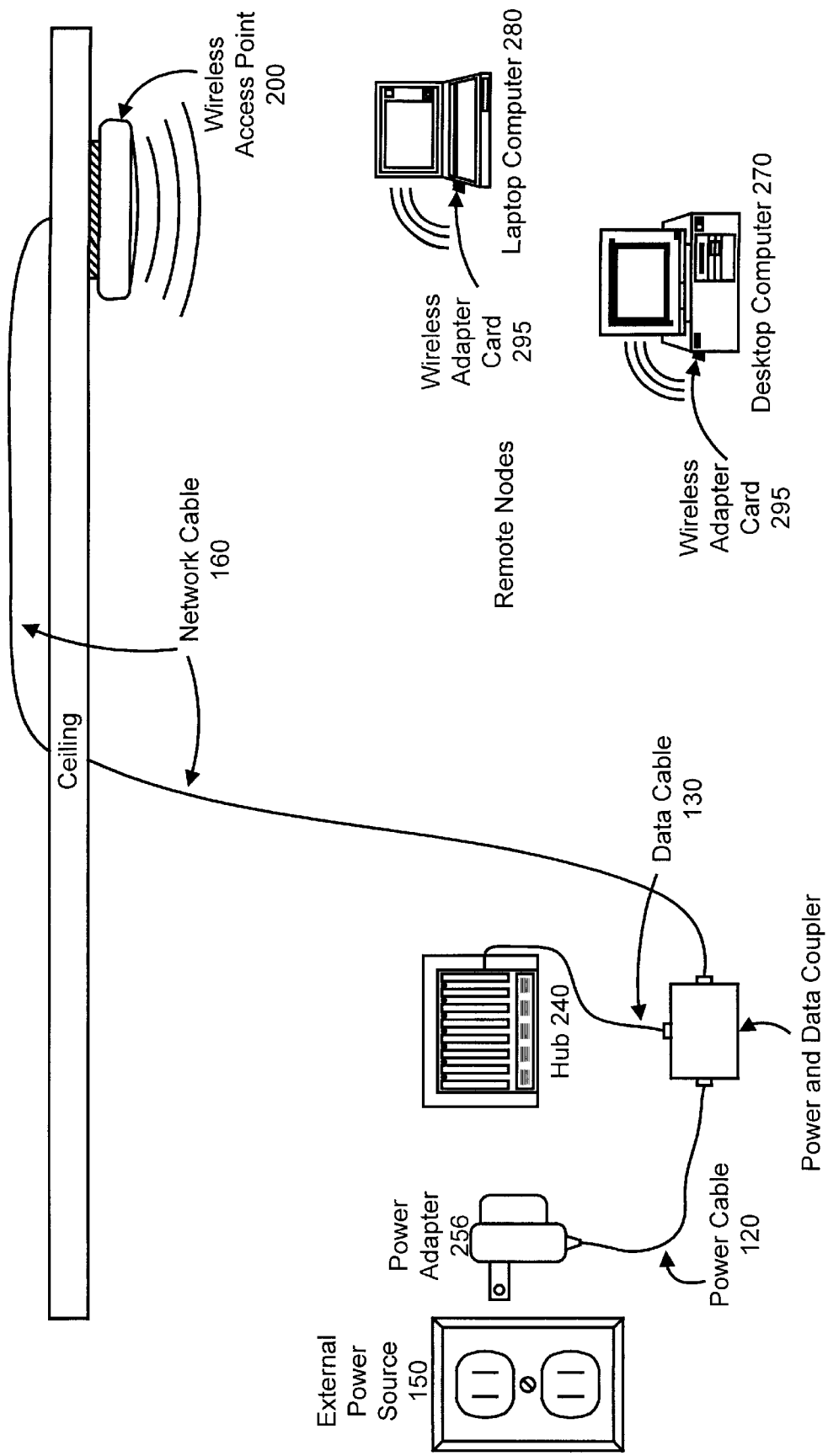
FIG. 2 is an overview of a power transfer apparatus for use with wireless access points.

FIG. 2 is an overview of a power transfer apparatus for use with wireless access points. The following lists the elements in FIG. 2 and then describes those elements. FIG. 2 includes: an external power source 150, a power adaptor 256, a power cable 120, a hub 240, a data cable 130, a power and data coupler 110, a network cable 160, a wireless access point 200, and a number of remote nodes. The remote nodes include laptop computers 280 and a desktop computer 270. Each computer includes a wireless adaptor card 295.

The power adaptor 256 steps down available electrical power from 117 or 220 volts AC to an AC or DC voltage that is high enough to provide adequate voltage for the wireless access point 200. In one embodiment, the power adaptor 256 supplies an output voltage of approximately twenty-four volts. Other embodiments of the invention have other output voltages, such as thirty-six and forty-eight volts. The power adaptor 256 is described in greater detail in the description of FIG. 5.

The hub 240 is not needed in one embodiment of the invention to supply the data signal. Therefore, in other embodiments of the invention, the data signal is supplied by a network computer, a router, and a bridge. In one embodiment, the hub 240 provides an ethernet based data signal supporting a data transfer rate of at least one megabit/second.

Regarding the power and data coupler 110, what is important is that there is some combined power and data signal 107 that can eventually be supplied to the wireless access point 200. Therefore, for example, in one embodiment, the power and data coupler 110 is included in a network card in the hub 240. The power signal 105, taken from the hub's power supply, can then be combined with the data signal provided by the hub 240.

The wireless access point 200 is an example of a network device 100. The wireless access point 200 includes a transceiver for providing wireless communications with the wireless adaptor cards 295. In this example, the wireless access point 200 is mounted on the ceiling. The wireless access point 200 is described in greater detail below.

The wireless adaptor cards 295 also include a transceiver for communicating with the wireless access point 200.

The desktop computer 270 and the laptop computer 280 are examples of some devices that may be included in one embodiment of the invention. For example, the desktop computer 270 can include an IBM compatible personal computer, or a MacOS™ compatible computer. However, other embodiments of the invention include other remote network nodes such as a Newton™ personal digital assistant and a pager.

The following describes the general operating of the system shown in FIG. 2. The power adapter 256 supplies power to the power and data coupler 110 while the hub 240 provides a data signal to the power and data coupler 110. The power and data coupler 110 communicates a combined power and data signal 107 to the wireless access point 200. The wireless access point 200 is powered from the power part of the power and data signal 107. The wireless access point 200 communicates a wireless data signal with the wireless adapter cards 295. The wireless data signal corresponds to the data signal from the hub 240. The wireless adapter cards 295 provide the desktop computer 270 and the laptop computers 280 with the wireless data signal.

Schematic Diagram of a Power Transfer Apparatus

Figure 3:
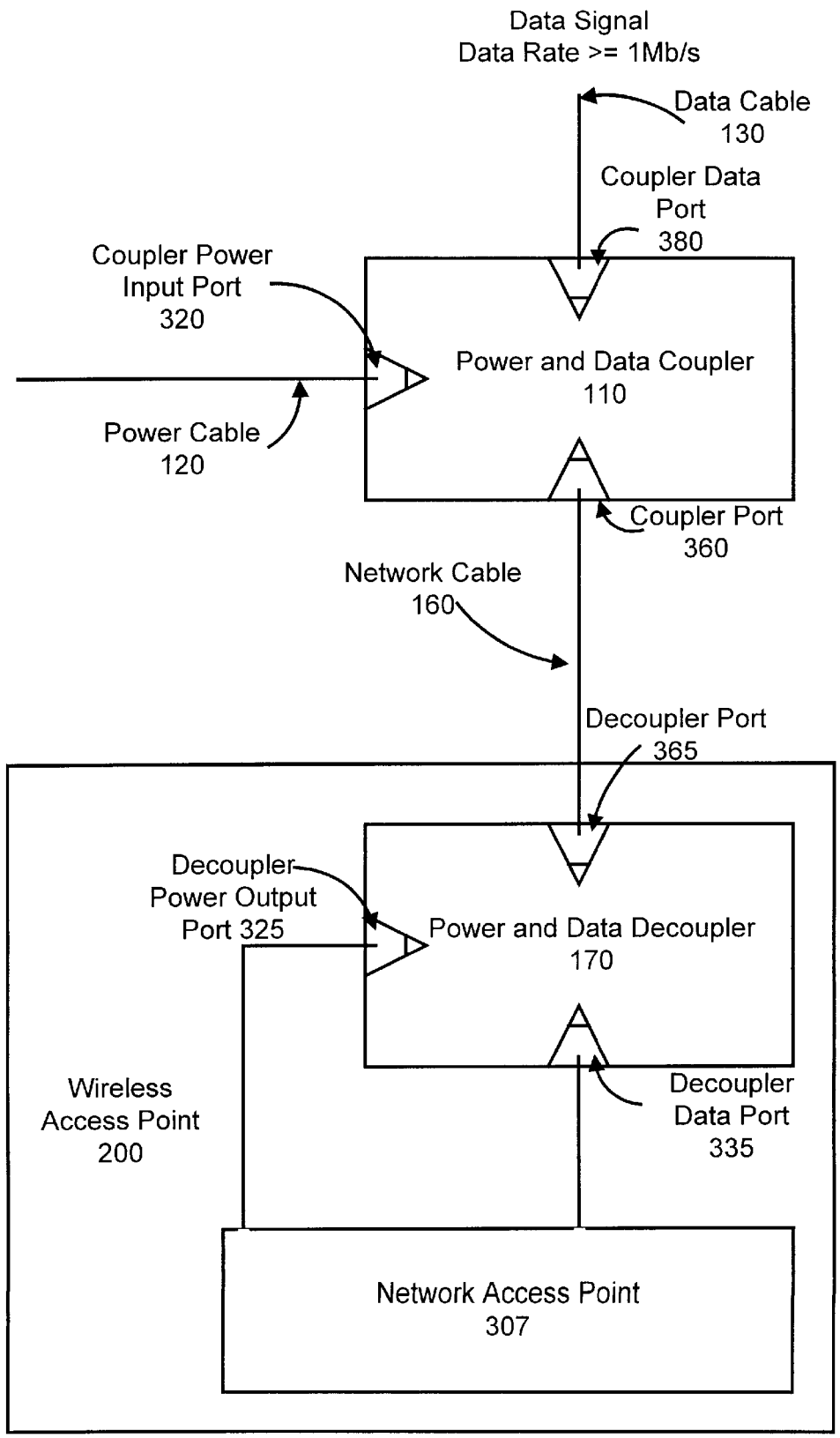
FIG. 3 is a schematic diagram of a power transfer apparatus.

FIG. 3 is a schematic diagram of a power transfer apparatus. The following first lists the elements in FIG. 3, then describes the elements' couplings, and then describes the elements' interactions.

FIG. 3 includes: the power cable 120, the data cable 130, power and data coupler 110, the network cable 160, and the wireless access point 200. The power and data coupler 110 includes a coupler power input port 320, a coupler data port 380 and a coupler port 360. The wireless access point 200 includes a power and data decoupler 170 and a network access point 307. The power and data decoupler 170 includes a decoupler port 365, a decoupler power output port 325 and a decoupler data port 335.

The elements of FIG. 3 are coupled as follows. The power cable 120 is coupled to the coupler power input port 320. The data cable 130 is coupled to the coupler data port 380. The network cable 160 is coupled to the coupler port 360 and to the decoupler port 365. The wireless access point 200 is coupled to the decoupler power output port 325 and to the decoupler data port 335.

The power and data decoupler 170 performs a function similar to that performed by the power and data coupler 110. However, the power and data decoupler 170 decouples the power signal from the data signal. The power and data decoupler 170 can then supply the power signal to the network access point 307 separately from the data signal.

The network access point 307 includes the transceiver for communicating with the remote nodes.

The elements of FIG. 3 interact as follows. The power cable 120 provides power supply current to the coupler power input port 320. The data cable 130 transmits the network data signal to the coupler data port 380. The power and data coupler 110 combines the power signal and the data signal and outputs this signal at the coupler port 360. The combined power and data signal is transmitted on the network cable 160. The wireless access point 200 receives the combined power and data signal through the decoupler port 365. The power and data decoupler 170 separates the network data signal from the power supply current. The power and data decoupler 170 then supplies the power signal at the decoupler power output port 325 and communicates the data signal to the network access point 307 at the decoupler data port 335. The network access point 307 uses the power signal to power wireless data signals to the remote nodes. The wireless data signals correspond to the data signal communicated with the decoupler data port 335.

In another embodiment of the invention, separate transmit and receive paths are supported between the power and data coupler 110 and the power and data decoupler 170. In this embodiment, the data cable 130 includes at least two wires supporting a transmit path and two wires supporting a receive path. Note that power is only coupled to the transmit path wires in one embodiment. While in another embodiment, all four wires are used in the power transmission.

Figure 4:
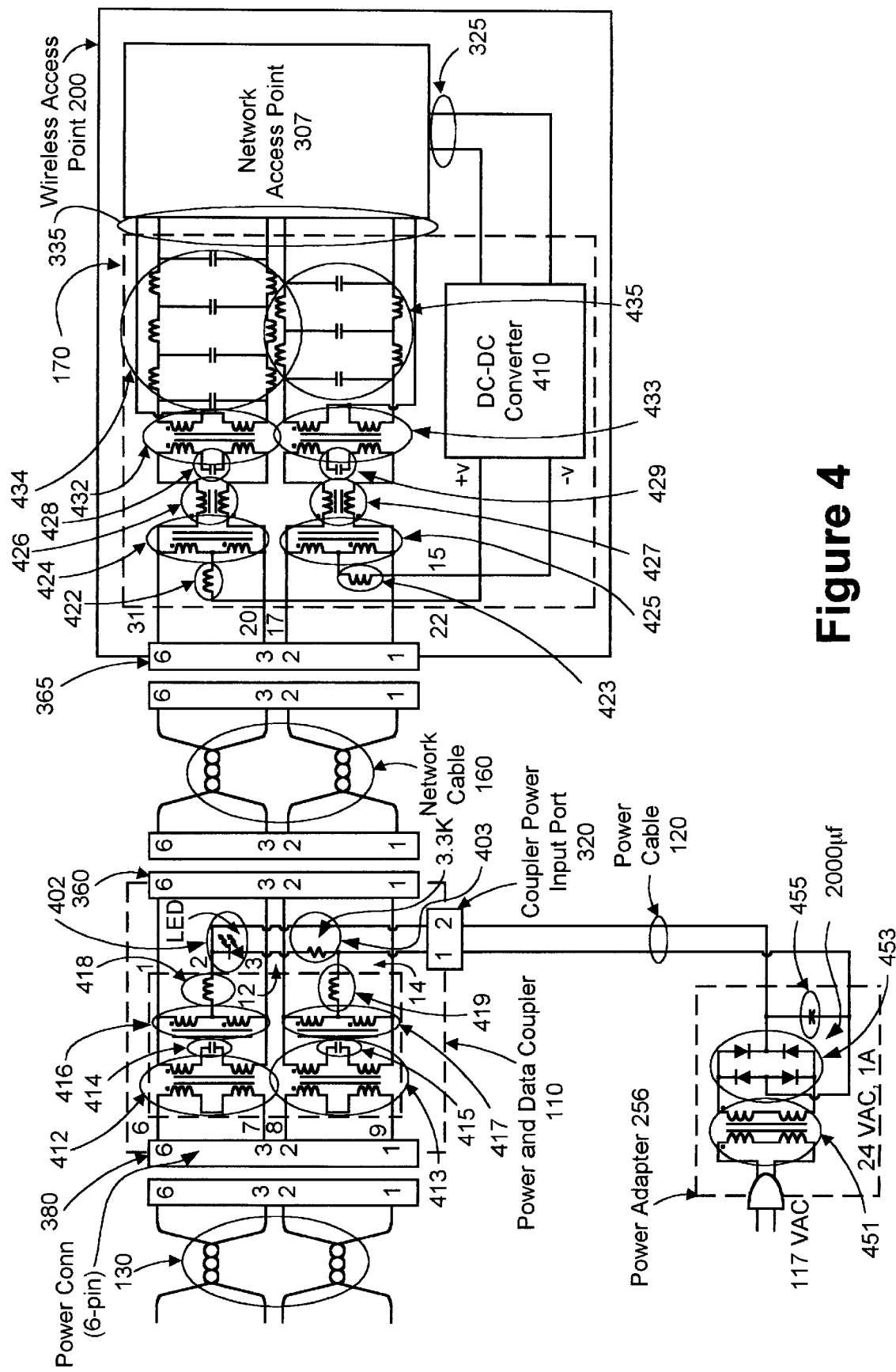
FIG. 4 is a more detailed schematic drawing showing a DC power transfer apparatus and corresponding circuitry located in the wireless access point

FIG. 4 shows a more detailed schematic of one configuration of this invention. The example shown in FIG. 4 is specifically adapted for the 10Base-T twisted pair networking protocol. Other embodiments of the invention support other network protocols. These embodiments include modifications for the number of wires used by the particular network protocol. The following lists the elements of FIG. 4, describes their interconnections, and then describes the operation of the elements.

FIG. 4 includes: the power adapter 256, the power cable 120, the data cable 130, the network cable 160 and the wireless access point 200. The power adapter 256 includes a stepdown transformer 451, a diode bridge 453, and a capacitor 455. The power and data coupler 110 includes: the coupler data port 380, a pair of isolation transformers (isolation transformer 412 and isolation transformer 413), a pair of center tapped inductors (inductor 416 and inductor 417), a pair of capacitors (capacitor 414 and capacitor 415), a pair of inductors (inductor 418 and inductor 419), a light emitting diode (LED 402), a resistor 403, and the coupler power and data port 360. The wireless access point 200 includes the network access point 307 and the power and data decoupler 170. The power and data decoupler 170 includes: the decoupler power and data port 365, a pair of inductors (inductor 422 and inductor 423), a pair or center tapped inductors (inductor 524 and inductor 425), a pair of common mode chokes (choke 426 and choke 427), a pair of capacitors (capacitor 428 and capacitor 429), a pair of isolation transformers (transformer 432 and transformer 433), a receive filter 434, a transmit filter 435, a DC-DC converter 410, a decoupler power output port 325, and the decoupler data port 335. In one embodiment, the lowpass filters, the common mode choke, and the transformers are all part of the wireless access point.

The elements in the power adapter 256 are coupled as follows. The primary winding of the transformer 451 is coupled to receive the power signal from the power adapter 256. The diode bridge 453 is connected to the secondary winding of the transformer 451. The capacitor 455 is connected across the output of the diode bridge 453. The output of the diode bridge 453 is connected to power cable 120.

The elements in the power and data coupler 110 are coupled as follows. In this example, the data signal is carried on four wires. Thus, the coupler data port 380 includes a four wire connection to the data cable 130. The primary windings of the transformer 412 are connected to the two data input wires of the coupler data port 380. Similarly, the primary windings of the transformer 413 are connected to the two data output wires of the coupler data port 380. The capacitor 414 and the capacitor 415 are connected in series with the secondary windings of the transformer 412 and the transformer 413, respectively. The center tapped inductor 416 and two output data wires of the coupler output port 360 are coupled across the secondary winding of the isolation transformer 412. Similarly, the center tapped inductor 417 and two input data wires of the coupler input port 360 are coupled across the secondary winding of the isolation transformer 413. The inductor 418 is connected between the center tap of the inductor 416 and to the positive wires of the power cable 120. The inductor 419 is connected between the center tap of the inductor 417 and the negative wires of the power cable 120. The resistor 403 and LED 402 are connected across the positive and negative wires of the power cable 120.

The elements in the wireless access point 200 are coupled as follows. The center tapped inductor 422 and the center tapped inductor 423 connect across the two input wires and two output wires, respectively, of the decoupler port 365. The inductor 422 connects to the center tap of the center tapped inductor 424 and to the positive terminal of the DC-DC converter 410. Similarly, the inductor 423 connects to the center tap of the center tapped inductor 425 and to the negative terminal of the DC-DC converter 410. The choke 426 connects to the ends of the center tapped inductor 424 and across the primary winding of the transformer 432. The choke 427 connects to the ends of the center tapped inductor 425 and across the primary winding of the transformer 433. The receive filter 434 connects between the secondary winding of the transformer 432 and the two output wires of the decoupler port 335. The transmit filter 435 connects between the secondary winding of the transformer 433 and the two input wires of the decoupler port 335. The DC-DC converter 410 connects to the decoupler power output 325.

The power adapter 256 operates as follows. Power is received from the external power supply at the primary winding of the transformer 451. The transformer 451 electrically isolates the power adapter 256. The diode bridge 453 performs full wave rectification of the alternating current from the secondary winding of the transformer 451. The capacitor 455 helps in the full wave rectification to create a DC output. The winding ratio of the transformer 451 and the value of the capacitor 455 is selected to provide the proper voltage output given the input voltage connected to the primary of the transformer 451. The power adapter 256 is representative of a variety of commercially available power adapters.

The power and data coupler 110 operates as follows. There is one isolation transformer (e.g., transformer 412) and one center-tapped inductor (e.g., 416) for each pair of networking data wires used in the particular networking standard. The data signal passes through these transformers with minimal loss. The transformers eliminate ground loops between the power and data coupler 110 and any network devices attached to coupler data port 330. The isolation transformers also isolate the power and data coupler 110 in case of accidental contact between the data cable 130 and a high voltage source. In one embodiment, the isolation transformer 412 and the isolation transformer 413 have a winding ratio of approximately 1:1 and an isolation of one thousand five hundred volts. The capacitor 414 and the capacitor 415 remove DC current from the data signal.

Each center-tapped inductor (e.g., inductor 416) presents an impedance close to zero Ohms for DC or low frequency AC current, however, the impedance across each wire pair to the data signal is significantly higher. (The low frequency AC current is low relative to the data signal frequency. In one embodiment, the low frequency AC current is less than one hundred Hertz while the data signal is greater than one Megahertz.) The use of center-tapped inductors permits the current to flow relatively unimpeded and balanced down each wire of the wire pairs connected across the winding of each center-tapped inductor. The equal current flow reduces the line resistance to DC and permits the current to flow equally to/from each end of the center-tapped inductor. The equal flow creates an equal and opposite DC flux within the core of the center-tapped inductor, preventing the saturation of the core of the center-tapped inductor. In one embodiment of the invention, the series inductor 418 and the series inductor 419 provide additional isolation between the power signal and the high-frequency data signal. The series inductors 418 and 419 are optional in some embodiments.

The data signal connection to the data cable 130 is provided through coupler data port 330 which is selected for compatibility with the particular network protocol used. Certain data cables have wires that are not used for data communication with certain protocols. For example, the CAT-3 or CAT-5 cable has four wires that are not used with the 10BASE-T standard (i.e. two sets of pairs). The power transmission apparatus of the invention transmits the power signal using only the wires normally used for data communication. The unused wires are not used.

One embodiment of the invention includes the resister 403 and the LED 402. The LED 402 indicates whether the power signal is being received by the power and data coupler 110. Although this indication is desirable from an operational point of view, the LED 402 and resistor 403 are not required for the operation of one embodiment of the invention.

The wireless access point 200 operates as follows. The wireless access point 200 receives the combined power and data signal at the decoupler port 365. The DC, or AC power, flows through the center-tap of the center-tapped inductor 424 and the center-tapped inductor 425. The DC-DC converter 410 is preferred because of its high efficiency and low self-power dissipation (the DC-DC converter 410 allows for lower input voltages). However other devices, such as linear regulators, may be used to regulated the specific voltage and varying current loads required by the network access point 307. The series inductor 422 and the series inductor 423 enhance the isolation between the data and power lines. The common mode choke 426 and the common mode choke 427 help suppress high frequency signal components that cause electromagnetic interference with the network access point 307. The data signal is provided across the secondary windings of the isolation transformer 432 and the isolation transformer 433. The data signal being sent to the network access point 307 is then filtered using the receive filter 434. The data signal being sent from the network access point 307 is filtered before being sent out on the network cable 160. The network access point 307 can then use the power signal from the DC-DC converter 410 and communicate information to and from the remote nodes and the network using the data signal.

Figure 5:
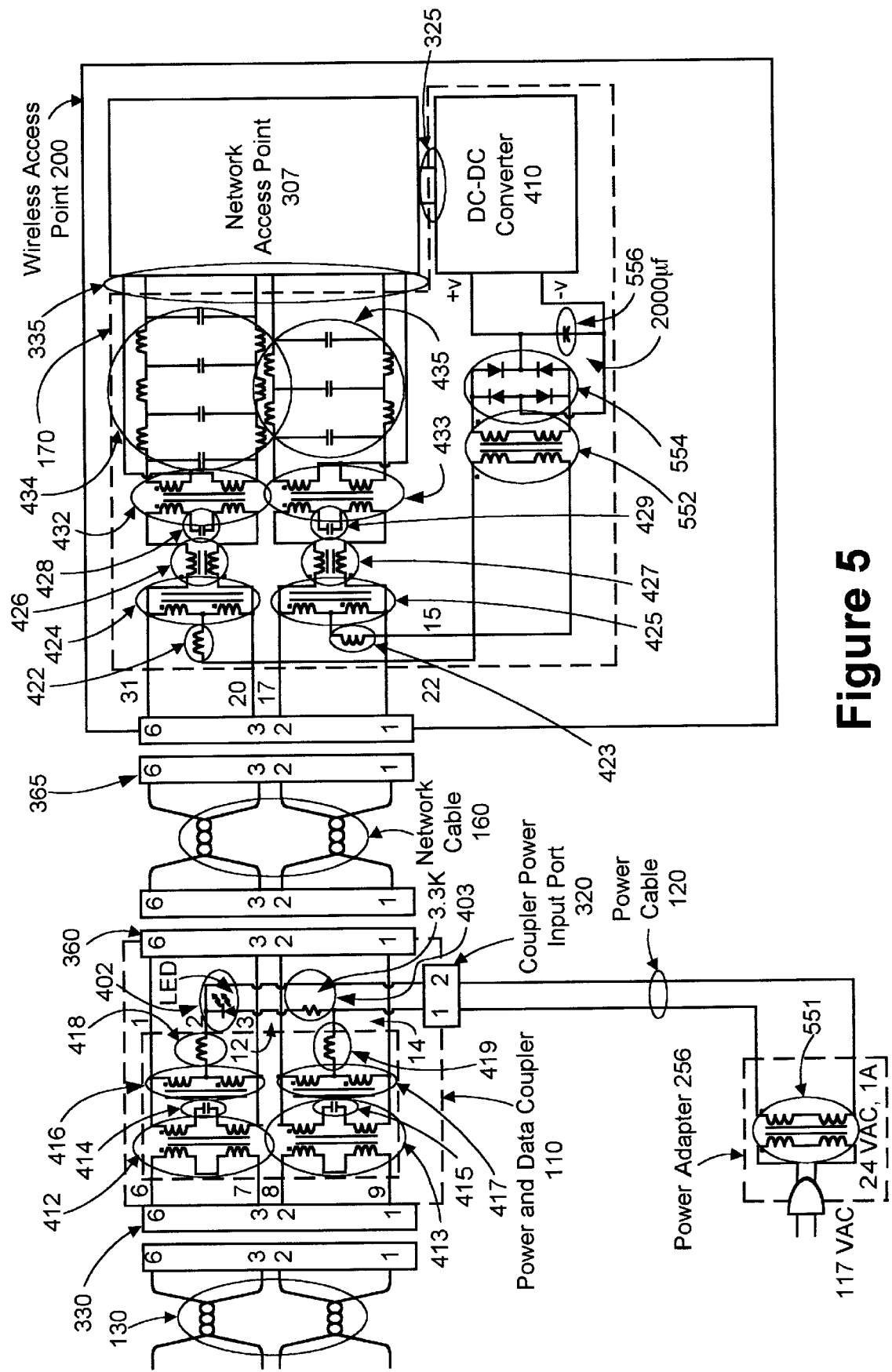
FIG. 5 is a more detailed schematic drawing showing an AC power transfer apparatus and corresponding circuitry located in the wireless access. This apparatus provides electrical isolation to the wireless access point.

FIG. 5 shows an alternate embodiment of the invention. In this embodiment, the power adapter 256 has been modified so that the secondary winding of transformer 451 is directly coupled to the power cable 120. The power and data decoupler 170 includes the following new elements: a transformer 552, a diode bridge 554, and a capacitor 556. The primary winding of the transformer 552 is connected across to the inductor 422 and the inductor 423. The input of the diode bridge 554 is coupled across the secondary winding of the transformer 552 and output of the diode bridge 554 is coupled to the DC-DC converter 410. The capacitor 556 is connected across the output of diode bridge 554.

In the alternative embodiment of the invention, the power adapter 256 provides low voltage AC power, instead of DC power, to the power and data coupler 110. The transformer 551 has a winding ratio to create low voltage AC power from the input high voltage AC power. The low voltage AC power is combined, in the same manner described above for the DC power, with the data signal. The combined power and data signal is then transmitted via network cable 160. The low voltage AC power is separated in the power and data decoupler 170 in the same manner as described above for the DC power. The low voltage AC power is then passed through the transformer 552 and the rectifying circuit (including the diode bridge 554 and the capacitor 556). The output of the rectifying circuit connects to the DC-DC converter 410. This configuration provides further enhanced isolation to the data cable and any networking accessories connected to the power and data coupler 110.

In one embodiment, the frequency of the AC power signal is substantially less than the frequency of the data signal. In various embodiments, the AC power signal has a frequency of 60 Hz, 440 Hz, and 56 Hz, while the data signal has a frequency of approximately 1 MHz, 10 MHz, and 1 GHz. However, the exact frequencies are not important, only that there is some difference between the frequencies.

The preceding has described multiple embodiments of the invention. In one embodiment, power and data are combined and transmitted to a wireless access point. The wireless access point uses the power to communicate with wireless network nodes. Because the power and data are combined, the installation of the wireless access point is simplified and may reduce the cost of installing the wireless access points.

While the foregoing invention has been described in referenced to some of its embodiments, it should be understood that various modifications and alterations will occur to those practiced in the art. Such modifications and alterations are intended to fall within the scope of the appended claims.

We claim:

1. An apparatus for providing electrical power supply current to at least one network device, comprising:

a transmission line having a proximal end and a distal end, the distal end coupled to the network device, the transmission line adapted for transmission of a data signal over a distance of greater than 3 meters at a data rate of greater than 1 megabits per second, wherein the data signal corresponds to a local area network data signal;

a coupler coupled to the proximal end of the transmission line, the coupler having a data input and a power input, the coupler couples power supply current from the power input and the data signal from the data input to the transmission line; and at least one decoupler coupled to the distal end of the transmission line, each of the at least one decoupler having a data output coupled to a corresponding one of the at least one network device and a power output coupled to the corresponding one of the at least one network device, each of the at least one decoupler supplies the data signal from the transmission line to the data output and power supply current from the transmission line to the power output, the power output being sufficient for operation of the at least one network device.

2. The apparatus of claim 1 wherein the transmission line provides a transmit path and supplies the data signal from the coupler to the decoupler, and the apparatus further including:

a second transmission line having a second proximal end and a second distal end, the second distal end coupled to the network device, the second transmission line adapted for transmission of a data signal over a distance of greater than 3 meters at a data rate of greater than 1 megabits per second, and the second transmission line providing a receive path and supplying the data signal from the decoupler to the coupler;

the coupler including a first receive path circuit coupled to the second proximal end, the coupler having a second data output, the coupler couples power supply current from the power input to the second transmission line, and the coupler supplies the data signal from the second transmission line to the data output;

the decoupler including a second receive path circuit coupled to the distal end of the second transmission line, the decoupler having a second data input coupled to the network device, the decoupler supplies the data signal from the data input to the second transmission line and power supply current from the second transmission line to the power output.

3. The apparatus of claim 1 wherein, the transmission line comprises two conductors, and the coupler supplies the first polarity component to the two conductors.

4. The apparatus of claim 2 wherein the power supply current has a first polarity component and a second polarity component, and the coupler supplies the first polarity component to the transmission line and the second polarity component to the second transmission line.

5. The apparatus of claim 4 wherein the power supply current includes alternating current, having a frequency of less than one hundred Hertz.

6. The apparatus of claim 4 wherein the power supply current includes direct current.

7. The apparatus of claim 1 wherein the transmission line comprises a twisted pair cable.

8. The apparatus of claim 2 wherein the transmission line and the second transmission line comprise a twisted pair cable.

9. The apparatus of claim 1 wherein the power supply current includes a first polarity component and a second polarity component, and the transmission line comprises two conductors, and the coupler includes a center tapped inductor having a first winding terminal coupled to one of the two conductors, a second winding terminal coupled to the other of the two conductors, and a center tap terminal connected to receive the first polarity component of the power supply current to distribute the first polarity component to the two conductors.

10. The apparatus of claim 9 wherein the data input comprises a differential input, and the coupler includes a transformer having a primary winding and a secondary winding, one of the primary winding and the secondary winding coupled across the differential input, and the other of the primary winding and the secondary winding coupled across the two conductors of the transmission line.

11. The apparatus of claim 10 wherein one of the primary winding and the secondary winding includes a capacitance for blocking DC components of the data signal.

12. The apparatus of claim 11 wherein the coupler includes an AC to DC converter coupled between the power input and the center-tapped inductor.

13. The apparatus of claim 1 wherein the power supply current includes a first polarity component and a second polarity component, and the transmission line comprises two conductors, and the decoupler includes a center tapped inductor having a first winding terminal coupled to one of the two conductors, a second winding terminal coupled to the other of the two conductors, and a center tap terminal coupled to decouple the first polarity component and transmit the first polarity component to the power output.

14. The apparatus of claim 13 wherein the data output comprises a differential output, and the decoupler includes a transformer having a primary winding and a secondary winding, one of the primary winding and the secondary winding coupled across the differential output, and the other of the primary winding and the secondary winding coupled across the two conductors of the transmission line.

15. The apparatus of claim 14 wherein one of the primary winding and the secondary winding includes a capacitance for blocking DC components of the data signal.

16. The apparatus of claim 14 wherein the decoupler includes an AC to DC converter coupled between the power output and the center-tapped inductor.

17. The apparatus of claim 1, wherein the operation of the at least one network device includes at least one of receiving, detecting, and processing the data signal.

18. The apparatus of claim 1, wherein the coupler includes:
   at least one pair of data wires; and
   an isolation transformer coupled with each pair of the at least one pair of data wires.

19. The apparatus of claim 18, wherein:
   the local area network data signal is received from a communications network;
   the data input corresponds to the local area network data signal; and
   the isolation transformer is adapted to isolate the communications network from the power input.

20. The apparatus of claim 1, wherein:
   the at least one decoupler inlcudes a plurality of decouplers; and
   each decoupler is coupled to the transmission line, and each decoupler continues to supply the data signal from the transmission line to the data output when an additional decoupler is coupled to the transmission line.

21. The apparatus of claim 5, wherein the decoupler includes:
   a voltage regulation device connected to the power output, the voltage regulation device having a positive terminal and a negative terminal; and
   a rectifier having an output coupled with the voltage regulation device to increase isolation of the coupler from the decoupler.

22. A power transmission adapter for concurrently transmitting a power supply current and a data signal at distances over three meters comprising:
   an electrical power port for receiving the power supply current;
   a data communication port adapted for receiving the data signal, the data signal having a data transfer rate of one Megabits per second or higher, the data signal including a local area network data signal;
   an output port having one or more data signal conductors adapted for transmitting the data signal; and
   a coupling circuit, coupled to the electrical power input port, the data communication port and the output port, the coupling circuit couples the data signal and the power supply current to create a coupled signal and transmits the coupled signal to the data signal conductors, the data signal conductors are coupled to at least one network access point, the coupled signal includes a power output sufficient for operation of the network access point.

23. The power transmission adapter of claim 22 wherein the power supply current includes a first polarity component and a second polarity component, and the coupling circuit includes a first bias circuit and a second bias circuit, each bias circuit having an impedance substantially equal to zero to current with a frequency low frequency relative to a frequency of said data signal, and also having a substantially higher impedance to a network data signal with a data transfer rate of one Megabits per second or higher, and the first bias circuit and second bias circuit being both coupled to the data communication port and the data signal conductors of the output port, the first bias circuit further being coupled to the electrical power input port to receive the first polarity component, and the second bias circuit further being coupled to the electrical power input port to receive the second polarity component.

24. The power transmission adapter of claim 23 wherein each bias circuit includes a center-tapped inductor having a first winding and a second winding and a center tap, the first winding and the second winding of both center-tapped inductors being coupled to the data communication port and the data signal conductors of the output port, the center tap of the first center-tapped inductors being coupled to the electrical power input port to receive the first polarity component, and the center tap of the second center-tapped inductor being coupled to the electrical power input port to receive the second polarity component.

25. The power transmission adapter of claim 22 wherein the data communication port is adapted for receiving an Ethernet protocol conforming data signal.

26. The power transmission adapter of claim 22, including:
   at least one pair of data wires; and
   an isolation transformer coupled with each pair of the at least one pair of data wires.

27. The power transmission adapter of claim 26, wherein:
   the local area network data signal is received from a communications network;
   the data input corresponds to the local area network data signal; and
   the isolation transformer isolates the communications network from the power supply current.

28. A power transmission adapter for decoupling a power supply current and a data signal from a coupled signal comprising:
   an input port having one or more data signal conductors adapted for receiving the coupled signal;
   an electrical power output port for transmitting the power supply current;
   a data communication port for transmitting the data signal, the data signal having a data transfer rate of 1 Megabits per second or higher, the data signal including a local area network data signal; and
   a decoupling circuit, coupled to the input port and the electrical power output port and the data communication port, and which decouples the data signal and the power supply current from the coupled signal and transmits the power supply current to the electrical power output port and the data signal to the data communication port, the power supply current is sufficient for at least one of receiving, detecting, and processing the data signal.

29. The power transmission adapter of claim 28 wherein the power supply current includes a first polarity component and second polarity component, and the decoupling circuit includes a first bias circuit and a second bias circuit, each bias circuit having an impedance substantially equal to zero to alternating current with a low frequency relative to a frequency of said data signal, each bias circuit having an impedance substantially equal to zero to direct current, and each bias circuit having a substantially higher impedance to a network data signal with a data transfer rate of 1 Megabits per second or higher, and the first bias circuit and the second bias circuit being coupled to the data communication port and the data signal conductors of the input port, and the first bias circuit being coupled to the electrical power output port to transmit the first polarity component to the electrical power output port, and the second bias circuit being coupled to the electrical power output port to transmit the second polarity component to the electrical power output port.

30. The power transmission adapter of claim 29 wherein each bias circuit includes a center-tapped inductor having a first winding, a second winding and a center tap, the first winding and the second winding of both center-tapped inductors being coupled to the data communication port and the data signal conductors of the input port, and the center tap of the first center-tapped inductor being coupled to the electrical power output port to transmit the first polarity component, and the center tap of the second center-tapped inductor being coupled to the electrical power output port to transmit the second polarity component.

31. The power transmission adapter of claim 30, wherein the power supply current includes direct current.

32. An apparatus for providing an electrical power signal to a wireless access point, the wireless access point providing wireless access to a plurality of wireless network devices, comprising:

a network transmission line having a proximal end and a distal end, the distal end coupled to the wireless access point, the network transmission line adapted for transmission of a local area network data signal to the wireless access point over a distance of greater than 3 meters, the local area network data signal being transmitted at greater than 1 megabits per second;

a coupler coupled to the proximal end of the network transmission line, the coupler having a data input and a power input, the coupler couples a power signal from the power input and the local area network data signal from the data input to the network transmission line; and a decoupler coupled to the distal end of the network transmission line, the decoupler having a data output coupled to the wireless access point and a power output coupled to the wireless access point, the decoupler supplies the local area network data signal from the network transmission line to the data output and power signal from the network transmission line to the power output.

\* \* \* \* \*